Jan. 20, 1970  L. A. CARLSTROM ET AL  3,490,852
GAS TURBINE ROTOR BUCKET COOLING AND SEALING ARRANGEMENT
Filed Dec. 21, 1967  2 Sheets-Sheet 1

INVENTORS:
LAWRENCE A. CARLSTROM,
WILLIAM M. FARRELL,
BY Robert J. Bird
THEIR ATTORNEY.

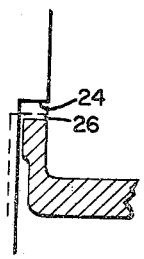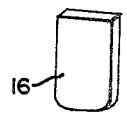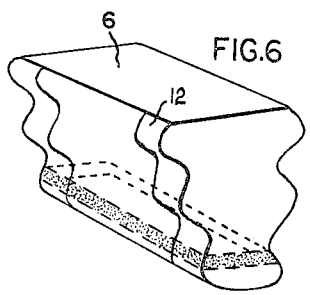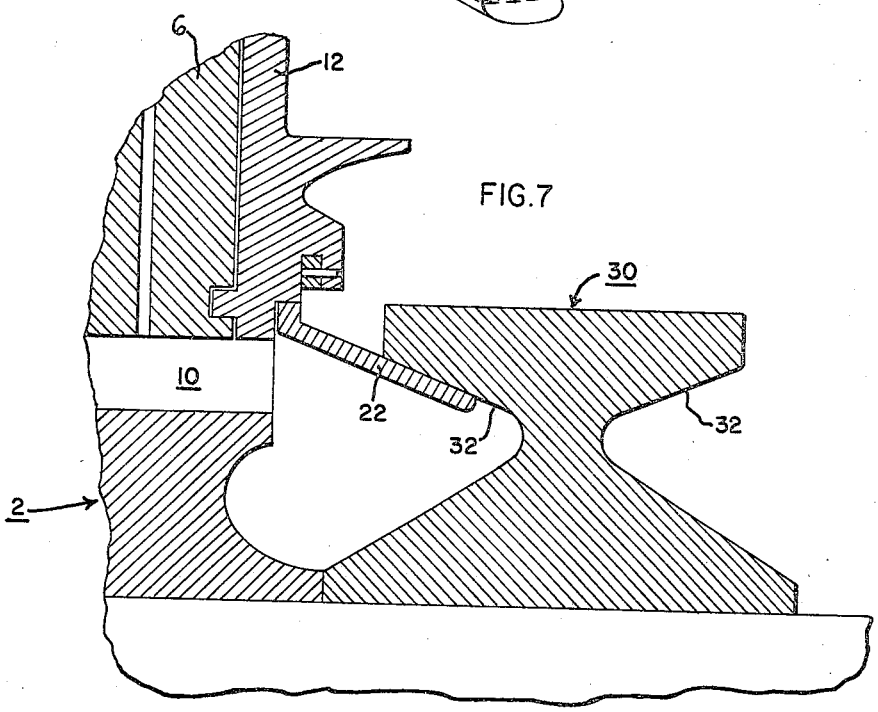

United States Patent Office 3,490,852
Patented Jan. 20, 1970

3,490,852
GAS TURBINE ROTOR BUCKET COOLING AND
SEALING ARRANGEMENT
Lawrence A. Carlstrom, Burnt Hills, and William M.
Farrell, Ballston Spa, N.Y., assignors to General Electric Company, a corporation of New York
Filed Dec. 21, 1967, Ser. No. 692,399
Int. Cl. F01d 5/08, 5/18
U.S. Cl. 416—95         3 Claims

ABSTRACT OF THE DISCLOSURE

A gas turbine bucket cooling and sealing arrangement in which bucket dovetail portion and wheel dovetail define substantially gas tight coolant chamber.

BACKGROUND OF THE INVENTION

This invention relates to improvements in cooling arrangements for turbomachines, particularly for the bladed rotors of such machines as gas turbines.

In turbomachines such as gas turbines, which are being built to operate at increasingly higher temperatures, cooling of the critical parts, especially in the rotor, becomes an increasingly important consideration. Various schemes have been proposed to effect the desired cooling of rotor buckets. These proposals have included the use of steam, air, and water for this purpose. One of the benefits of using air is the fact that it is readily available in a gas turbine cycle. However, a gas turbine compressor uses a large portion of the power of the machine and therefore it is desirable that any use of this compressed air, either for combustion or cooling, or any other purpose, be made in a leak-tight system.

Accordingly, it is one object of the present invention to provide for a gas turbine rotor bucket, an air coolant flow path which is substantially leak-tight in operation.

Other objects, advantages and features of the present invention will become apparent from the following description of one embodiment thereof when taken in connection with the accompanying drawing.

SUMMARY OF THE INVENTION

Briefly, the present invention is practiced in one form by a gas turbine bucket dovetailed into a gas turbine wheel with an air chamber under the bucket root. Centrifugal force of the rotor bucket produces inherent sealing contact between bucket and wheel dovetails. On one end of the coolant chamber is a seal member which similarly is held in a sealing position by centrifugal force. The other end of the chamber is defined by a coolant flow plate which is biased in radial sealing position by centrifugal force and in axial sealing position by its own spring action or by centrifugal force.

DRAWING

Figure 1:
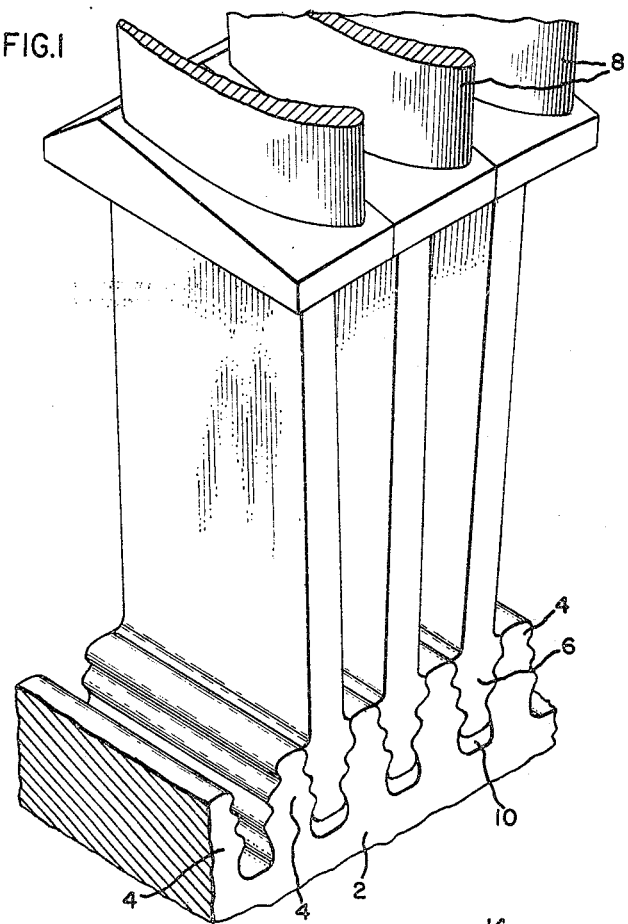
Figure 2:
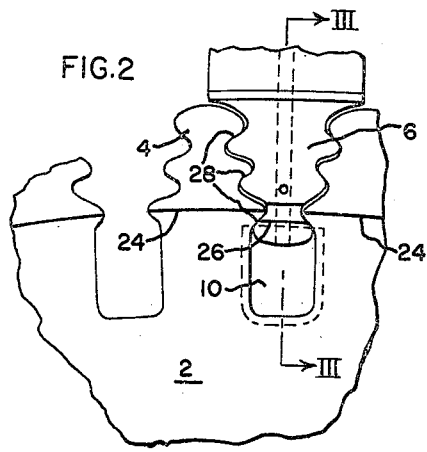
Figure 3:
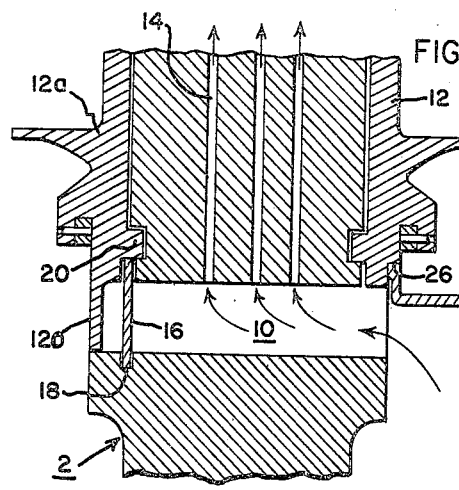

In the drawing:
FIG. 1 is a perspective view of a part of a gas turbine rotor showing wheel teeth and buckets.
FIG. 2 is an axial view of the rotor stage of FIG. 1.
FIG. 3 is a side sectional view taken along the line III—III of FIG. 2.
FIG. 4 is an enlarged sectional view showing a detail of FIG. 3.
FIG. 5 is a perspective view of another detail.
FIG. 6 is a perspective view of the combined bucket dovetail and bucket coverplate dovetail showing a feature of the present invention.
FIG. 7 is a detail showing an alternative of a feature of this invention.

DESCRIPTION

Referring now to FIG. 1, there is shown a segment of a gas turbine rotor wheel 2 from which a series of rotor teeth 4 are machined. Teeth 4 are dovetailed so as to accommodate the mating dovetail root portions 6 of rotor buckets 8. There is an axially extending coolant chamber 10 at the base of each of the bucket roots and defined thereby and by wheel teeth 4.

Referring now to FIGS. 2 and 3 together, there is a coverplate 12 on each end face of the rotor buckets 8 which extends from the dovetail base or root portion 6 to the vane portion of the bucket. Coverplate 12a on one end of the bucket has an extension 120 by which the coverplate projects to the depth of the tooth space 10 and provides a continuous or flush surface on that side of the rotor wheel. That is, the ends of the wheel teeth 4 and the end face of projection 120 form a flush surface to reduce windage within the turbine which would otherwise result due to the dovetail openings at 10. Coverplate 12 on the opposite end of bucket 8 has a dovetail outline the same as that of bucket dovetails 6.

Rotor buckets 8 and dovetail portions 6 have radial passages 14 extending therethrough which communicate at their radially inner ends with coolant chamber 10. Coolant chamber 10 is sealed at one of its ends by a seal member 16 which projects radially from a key seat 18 machined from the rotor wheel 2 and in operation is disposed in radial abutment with a flange 20 which extends in an axial direction from coverplate 12a. (End seal member 16 is shown separately in FIG. 5.)

A coolant flow plate 22 extends radially outward along the face of the rotor wheel 2 opposite the seal member 16. Flow plate 22 defines with the wheel 2 a passage for the radial flow of coolant air. Coolant flow plate 22 is of a resilient material and is somewhat cup-shaped. It is pre-loaded or biased into axial contact with wheel 2 and bucket coverplates 12. Thus, flow plate 22 will flex both axially due to the biasing and radially due to centrifugal force to effect a sealing relationship with the rotor wheel 2 and the bucket cover plate 12. In an axial direction, the rotor wheel 2 extends slightly beyond or outward from the bucket coverplates 12. This is to insure that the axial biasing of the coolant flow plate 22 is against the rotor wheel 2 without interference from coverplates 12. This is illustrated in FIG. 4.

The rotor wheel has a circumferential shoulder 24. The bucket coverplates 12 each have a similar shoulder 26 such that in the assembled rotor the shoulders 24 and 26 are a substantially circular whole. However, shoulder 24 on the wheel is at a slightly greater diameter than shoulders 26 on the coverplates. This is to insure that the radial biasing of coolant flow plate 22 will be against the coverplate shoulders 26 without interference from wheel shoulders 24. This too is illustrated in FIG. 4.

In FIG. 2, it will be seen that the bucket dovetails when urged against the wheel dovetails by centrifugal force, form a seal or seals therewith at points 28. The lowermost of these seal surfaces 28 is at the same radial dimension as is the sealing surface between seal member 16 and coverplate flange 20 and also at the same radius as the sealing connection between coolant flow plate 22 and coverplate shoulders 26. The effect of this, having the seal lines at the same radius, is to form a complete seal around the perimeter of the bucket dovetail or base portion 6 such that coolant chamber 10 is substantially leak tight. In FIG. 6, showing a portion of the bucket base, the phantom lines indicate the lines of sealing between the bucket root and seal member 16 at the rear, between bucket root and coolant flow plate 22 at the front, and between bucket dovetails and wheel dovetails on each side. The result, then, is to provide a coolant flow passage leading to a coolant chamber 10 which is substantially sealed from all leakage in all directions, the flow going therefrom only through the proper coolant passages 14.

In FIG. 7, showing an alternate embodiment, a spacer 30 is positioned between successive rotor wheels 2. Spacer 30 has an inclined or conical surface 32 machined thereon against which coolant flow plate 22 is disposed. In operation, it will be appreciated that the axial biasing of flow plate 22 against wheel shoulders 24 results from centrifugal action of plate 22 on the inclined or conical surface 32.

It will be apparent that an improved gas turbine bucket cooling and sealing arrangement has been disclosed herein which provides for the passage of air to cool a turbine bucket with a minimum of air leakage. By use of this arrangement, therefore, economy in the use of coolant air can be realized.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

What is claimed is:

1. A gas turbine rotor bucket cooling and sealing arrangement including a rotor wheel having a plurality of buckets dovetailed there-around, said buckets and said wheel cooperating to define coolant chambers under the bases of said buckets, said chambers being in communication with coolant passages through said buckets and with a source of coolant fluid, and characterized by the improvement including:

a plurality of cover plates extending from the dovetail base to the vane portion on each axial end of said buckets and covering the end faces of said buckets, a keyseat in said coolant chamber toward one side thereof having a plurality of seal members disposed therein, each of said seal members extending across said coolant chambers to close one end thereof, said seal members being in radial abutment with an axially extending portion of said cover plates, a coolant flow plate disposed at the side of said wheel opposite from said seal members and defining with said wheel an annular coolant flow space, said coolant flow plate having a curved configuration and means to resiliently bias it against the side of said wheel and in radial abutment with an axially extending portion of said cover plates, the areas of contact of said seal members and said coolant flow plate with said flanges and of one of the bucket dovetails with the wheel all having substantially the same radial dimension.

2. The improvement according to claim 1 further including a spacer disposed between successive rotor wheels, said spacer defining a coaxial conical surface, said coolant flow plate disposed within and adjacent said conical surface so that in operation, centrifugal force urges said flow plate into axial engagement with said rotor wheel.

3. The improvement according to claim 1 in which said cover plates are dovetailed to said wheel.

References Cited

UNITED STATES PATENTS

| | | |
|---|---|---|
| 2,974,926 | 3/1961 | Thompson. |
| 2,985,426 | 5/1961 | Hunter et al. |
| 2,988,325 | 6/1961 | Dawson. |
| 3,010,696 | 11/1961 | Everett. |
| 3,266,770 | 8/1966 | Harlow. |
| 3,343,806 | 9/1967 | Bobo et al. _____ 253—39.15 |
| 3,356,340 | 12/1967 | Bobo _____ 253—39.15 |

LAURENCE M. GOODRIDGE, Primary Examiner

U.S. Cl. X.R.

416—92